W. NAUMANN.
MOTOR CONTROL.
APPLICATION FILED MAR. 10, 1911.
1,036,688.
Patented Aug. 27, 1912.
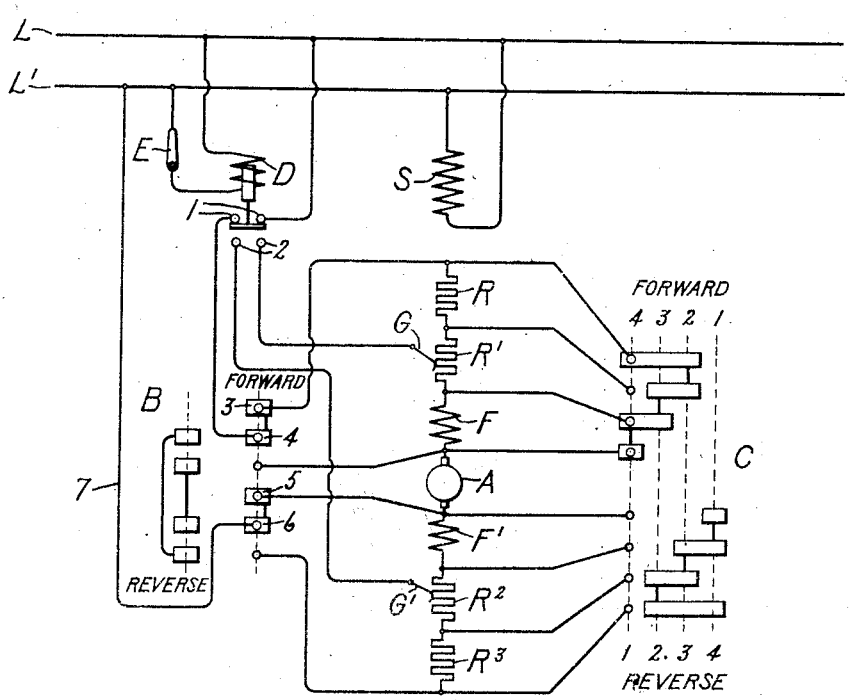

UNITED STATES PATENT OFFICE.

WILHELM NAUMANN, OF PANKOW, GERMANY, ASSIGNOR TO GENERAL ELECTRIC COMPANY, A CORPORATION OF NEW YORK.

MOTOR CONTROL.

1,036,688.   Specification of Letters Patent.   Patented Aug. 27, 1912.

Application filed March 10, 1911. Serial No. 613,616.

*To all whom it may concern:*

Be it known that I, WILHELM NAUMANN, a subject of the King of Prussia, residing at Pankow, Germany, have invented certain new and useful Improvements in Motor Control, of which the following is a specification.

This invention relates to the control of electric motors and has for its object the provision of means whereby an electric motor may be started, stopped, and generally controlled in a reliable and efficient manner.

My invention relates more specifically to the type of motor control in which provision is made for stopping the motor by causing it to act as a generator to retard the rotation of the armature by a braking effect.

My invention is particularly applicable to motors intended for reversing, the arrangement being such that the motor will be automatically braked when the motor circuit is opened to stop the motor when running in either direction.

In carrying out my invention in one form, I provide the motor with a permanent shunt field and two series fields, one for each direction of rotation. These fields may be connected one to each side of the armature and have a resistance connected in series therewith for starting. I also provide a controller for cutting out the starting resistance. This controller may be arranged to short circuit the series field when the motor gets up to speed. A reversing switch is likewise provided for directing the current through the motor for opposite directions of rotation. The switch which controls the motor circuit is so arranged that when it is opened, a braking circuit is established through the armature and the field which has been inactive, the other field being short circuited so that there is always an inactive or deënergizing field ready for connecting in circuit with the armature for braking when the switch is opened.

In the accompanying drawing in which I have disclosed my invention embodied in concrete form for purposes of illustration, A represents the armature of a reversible motor and F and F' the two series fields connected thereto. The fields are connected one on each side of the armature.

S represents a shunt field of the motor which is permanently connected across the line. In series with the field F are two sections of resistance R, R' and similar resistances $R^2$ $R^3$ in series with the field F. The controller C is arranged when moved in the "forward" direction to cut out resistance sections R and R' step by step and finally short circuit the field F when the controller is in the position marked 4. Similarly, when the controller is moved in the "reverse" direction the sections of resistance $R^2$ $R^3$ are cut out and finally the field F' short circuited. A reversing switch B is arranged so as to connect the current either through the field F and its attached resistances or the field F' for opposite directions of rotation, the direction of current through the armature in each case being reversed. The switch for opening and closing the motor circuit I have shown as a solenoid switch D arranged to bridge contacts 1 when energized and bridge the contacts 2 when deënergized. This solenoid is controlled by the control switch E. One of the contacts 2 is connected with an adjustable member G of the resistance R', while the other is connected with the member G' of the resistance $R^2$.

As thus constructed and arranged, the operation of my device is as follows: When the switch E is closed and assuming that the reversing switch B is set for "forward" movement and the controller C in the starting position for "forward" movement, the solenoid D is energized and the contacts 1 are bridged, thereby completing a circuit from the line L across the contacts 1, through the contact fingers 3, 4 on the reversing switch B, through the resistances R R', field F, armature A, controller fingers 5, 6 and conductor 7 back to line L'. As the controller C is moved to the second position the resistance R is short circuited and when it is moved to the third position the resistance R' is short circuited. When the controller is moved to the last forward position, the field F, which has been connected in series with the motor armature for starting, is short circuited. The motor is now normally running in the forward direction, the parts being in the position shown in the drawing. If now the switch E is opened to stop the motor, contacts 2 will be bridged. This causes a braking circuit to be established through the armature from the upper brush through the controller contacts which short circuit the field F, portion of resistance R' determined by the position of the adjustable member G, contacts 2, portion of resistance R², determined by the position of the movable member G', field F' and back to the armature. That causes the armature to generate a current which acts as a dynamic brake to stop the rotation of the armature. The amount of braking effect may be varied by moving the members G and G'. When the reversing switch B is thrown to the opposite position, the current through the armature is reversed and the field F' is energized in series with the armature and with the resistances R² and R³. These resistances are then cut out by the movement of the controller in the reverse direction until the field F' is short circuited. On opening the motor circuit at the switch E, the braking circuit is again established.

It will thus be seen that I have provided a convenient and efficient arrangement for starting and quickly stopping an electric motor running in either direction, and while I have disclosed my invention as embodied in concrete form for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. The combination with a reversible electric motor having a shunt field and two series fields, one for each direction of rotation, of a switch in the motor circuit, and connections whereby when said switch is opened a braking circuit is completed through the armature and one field.

2. The combination with a reversible electric motor having a shunt field and two series fields, one for each direction of rotation, of a controller for said motor arranged to short circuit one of said fields during normal running, a switch in the motor circuit, and connections whereby a braking circuit is completed through the armature and the other field when said switch is opened.

3. The combination with an electric motor having a shunt field and two series fields, one connected to each side of the armature of said motor for opposite directions of rotation, of a switch in the motor circuit, and connections whereby when said switch is opened a braking circuit is completed through the armature and one of said fields while the other field is short circuited.

4. The combination with a reversible electric motor having a shunt field and two series fields, of a reversing switch arranged to energize either of said fields for opposite directions of rotation, a switch in the motor circuit, and connections whereby a braking circuit is completed through the armature and the deënergized field when said switch is opened.

5. The combination with a reversible electric motor having a shunt field and two series fields, one connected to each side of the armature for opposite directions of rotation, a resistance in series with each of said fields, a controller for cutting out one of said fields and the resistance connected thereto to bring the motor to running speed in each direction, a switch in the motor circuit, and connections whereby a braking circuit is established through the armature and the other field when the switch is opened.

6. The combination with a reversible electric motor having a shunt field and two series fields, a reversing switch arranged to energize either of said fields for opposite directions of rotation, a resistance in series with each field, a controller for cutting out one field and the resistance connected thereto, a switch in the motor circuit, and connections whereby when said switch is opened a braking circuit is established through the armature and the other field.

7. The combination with a reversible electric motor, of a starting resistance connected with each side of the armature, a controller arranged to cut out one of said resistances when moved in one direction and the other resistance when moved in the opposite direction, and a reversing switch for changing the direction of current through said motor.

8. The combination with an electric motor having a shunt field and two series fields, one connected to each side of the armature, of a starting resistance connected to each field, and a controller arranged to cut out one field and the resistance connected thereto when moved in each direction, and a reversing switch for changing the direction of current through said motor.

9. The combination with an electric motor, of a starting resistance connected with each side of the armature, a controller arranged to cut out one of said resistances when moved in one direction and the other resistance when moved in the opposite direction, a reversing switch for changing the direction of the current through said motor, a switch in the motor circuit, and connections whereby when the said switch is opened a braking circuit is established through the armature and one of said resistances.

10. The combination with a reversible electric motor having a shunt field, of a series field connected to each side of the armature and a starting resistance connected to each field, a controller arranged to cut out one of said resistances, and a field connected thereto when moved in each direction, a reversing switch for changing the direction of current through said motor, a switch in the motor circuit, and connections whereby when said switch is opened a braking circuit is established through the armature and one of said resistances.

11. The combination with a motor, of two separate series field windings therefor, a supply circuit, means for connecting the armature of the motor through one of said field windings to the supply circuit, and means operating when said circuit is opened to short circuit said armature upon itself through the other of said field windings.

12. The combination with a motor, of a pair of separate series field windings therefor, and means for connecting either of said field windings in either an operating or braking circuit, including the armature of the motor.

13. The combination with a motor, of a pair of separate series field windings therefor, means for connecting said field windings alternately in series with the armature of the motor in the operating circuit, and means for connecting either of said field windings in a braking circuit also including said armature.

In witness whereof, I have hereunto set my hand this 15th day of February, 1911.

WILHELM NAUMANN.

Witnesses:
FREDRICK GICHBY,
LEOPOLD FANISCH.

---

Copies of this patent may be obtained for five cents each, by addressing the "Commissioner of Patents, Washington, D. C."